United States Patent
Kim et al.

(10) Patent No.: US 12,528,437 B2
(45) Date of Patent: Jan. 20, 2026

(54) KNEE AIR BAG

(71) Applicant: HYUNDAI MOBIS CO., LTD., Seoul (KR)

(72) Inventors: Do Hyoung Kim, Yongin-Si (KR); Dong Young Kim, Hwaseong-Si (KR); Seok Hoon Ko, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/088,326

(22) Filed: Mar. 24, 2025

(65) Prior Publication Data

US 2025/0242774 A1    Jul. 31, 2025

Related U.S. Application Data

(62) Division of application No. 17/894,316, filed on Aug. 24, 2022, now abandoned.

(30) Foreign Application Priority Data

Oct. 25, 2021    (KR) .......................... 10-2021-0142886

(51) Int. Cl.
*B60R 21/206*    (2011.01)
*B60R 21/00*    (2006.01)
*B60R 21/216*    (2011.01)

(52) U.S. Cl.
CPC .......... *B60R 21/206* (2013.01); *B60R 21/216* (2013.01); *B60R 2021/0051* (2013.01)

(58) Field of Classification Search
CPC ................ B60R 21/206; B60R 21/216; B60R 2021/0051
See application file for complete search history.

(56) References Cited

U.S. PATENT DOCUMENTS

| 5,536,043 | A   |   | 7/1996  | Lang et al. |            |
|-----------|-----|---|---------|-------------|------------|
| 5,931,493 | A   | * | 8/1999  | Sutherland  | B60R 21/215 |
|           |     |   |         |             | 280/753    |
| 6,431,583 | B1  | * | 8/2002  | Schneider   | B60R 21/216 |
|           |     |   |         |             | 280/743.2  |
| 6,464,255 | B1  | * | 10/2002 | Preisler    | B60R 21/206 |
|           |     |   |         |             | 280/752    |

(Continued)

FOREIGN PATENT DOCUMENTS

KR    101720980 B1    3/2017

*Primary Examiner* — Jason D Shanske
*Assistant Examiner* — Joselynn Y Sliteris
(74) *Attorney, Agent, or Firm* — NovoTechIP International PLLC

(57) ABSTRACT

A knee airbag is proposed. The knee airbag is configured to be applied to a slim-type cockpit design and to quickly restrain the knees of an occupant without increasing a package of an airbag cushion to reduce a risk of injuries to the occupant. The knee airbag includes an airbag housing provided at a lower end of a cockpit, and including an airbag cushion located toward an occupant, a cover assembled to the airbag housing in a shape of covering the airbag cushion, wherein in deployment of the airbag cushion, a lower portion of the cover is fixed to the airbag housing and an upper portion thereof is separated and opened from the airbag housing, and an opening limiting unit configured to limit an opening degree of the upper portion of the cover.

5 Claims, 9 Drawing Sheets

(56) References Cited

U.S. PATENT DOCUMENTS

| | | | | |
|---|---|---|---|---|
| 7,182,365 B2 * | 2/2007 | Takimoto | ............... | B60R 21/206 |
| | | | | 280/743.1 |
| 7,370,881 B2 * | 5/2008 | Takimoto | ............... | B60R 21/237 |
| | | | | 280/732 |
| 7,393,011 B2 * | 7/2008 | Keshavaraj | ............ | B60R 21/206 |
| | | | | 280/739 |
| 7,600,776 B2 * | 10/2009 | Hoshino | ............. | B60R 21/2032 |
| | | | | 280/752 |
| 10,696,266 B2 * | 6/2020 | Enders | ................... | B60R 21/206 |
| 10,829,074 B2 * | 11/2020 | Jacobson | ............... | B60R 21/231 |

* cited by examiner

KNEE AIR BAG

CROSS-REFERENCE TO RELATED APPLICATIONS

The present application is a continuation of co-pending U.S. application Ser. No. 17/894,316 filed on Aug. 24, 2022 which claims the benefit of priority to Korean Patent Application No. 10-2021-0142886, filed Oct. 25, 2021, the disclosure of which is incorporated herein by reference in its entirety.

TECHNICAL FIELD

The present invention relates to a knee airbag configured to be applied to a slim-type cockpit design and to quickly restrain the knees of an occupant without increasing a package of an airbag cushion to reduce a risk of injuries to the occupant.

BACKGROUND

A knee airbag device is a device configured to deploy an airbag cushion thereof between a crash pad and the knees of the occupant to protect the knees of the occupant.

The knee airbag device includes an airbag housing mounted to the inside space of an instrument panel, and an inflator that is a gas generating device and an airbag cushion are stored in the airbag housing, so that gas generated by the inflator is supplied into the airbag cushion in a collision accident so as to deploy the airbag cushion upward from a lower end of the instrument panel toward an occupant and to protect the knees of the occupant.

Recently, as one of the measures to increase the utilization of the interior space of the vehicle, the cockpit is being designed to be slim.

However, as the slim-type cockpit is greatly reduced in size in a longitudinal direction compared to an existing cockpit due to slimming, the distance between the cockpit and the occupant is increased, causing a problem in that the occupant's knees-restraint is delayed and a problem in that a space to which the knee airbag is mounted becomes insufficient.

Therefore, it is possible to consider increasing the volume of the airbag cushion to quickly restrain the occupant's knees, but the airbag package is inevitably increased, and the space to store the knee airbag becomes more insufficient.

The foregoing is intended merely to aid in the understanding of the background of the present invention, and is not intended to mean that the present invention falls within the purview of the related art that is already known to those skilled in the art.

SUMMARY

The present invention has been made keeping in mind the above problem occurring in the related art, and the present invention is intended to a knee airbag, wherein the knee airbag is applied to a slim-type cockpit design and quickly restrains the knees of an occupant without increasing a package of an airbag cushion to reduce a risk of injuries to the occupant.

In order to achieve the above objective, according to one aspect of the present invention, there is provided a knee airbag including: an airbag housing provided at a lower end of a cockpit, and including an airbag cushion located toward an occupant; a cover assembled to the airbag housing in a shape of covering the airbag cushion, wherein when the airbag cushion is deployed, a lower portion of the cover may be fixed to the airbag housing and an upper portion thereof may be separated and opened from the airbag housing; and an opening limiting unit configured to limit an opening degree of the upper portion of the cover.

The opening limiting unit may be configured to limit the upper opening degree of the cover by an extended length of a connection part that may be connected to both the airbag housing and the cover while being located therebetween to be extendable.

The connection part may be connected to both the airbag housing and the cover with a tether.

The connection part may be connected to both the airbag housing and the cover with a link.

The connection part may be connected to an outer surface of the airbag cushion from each of the airbag housing and the cover.

The connection part may be connected to a selvage formed at an outer surface of the airbag cushion.

A hook may be formed in the connection part and a hooking hole may be formed in each of the airbag housing and the cover, so that the hook may be assembled to the hooking hole.

The connection part may be connected to both the airbag housing and the cover by riveting.

A lower end of the cover may be coupled to the airbag housing in a hinge structure, so that the upper portion of the cover may rotate on the hinge structure to be opened.

The cover may be opened in a shape inclined upward toward the occupant.

As described above, the knee airbag of the present invention is configured such that in deployment thereof the cover is opened while the opening degree of the cover is limited by the connection part.

Therefore, as the airbag cushion is guided by the cover to be deployed upward toward the occupant, the airbag cushion is deployed without sagging thereof, and the knees of the occupant are quickly restrained without increasing the package of the airbag cushion, so that there is an effect of reducing a risk of injuries to the occupant

DETAILED DESCRIPTION

Figure 1:
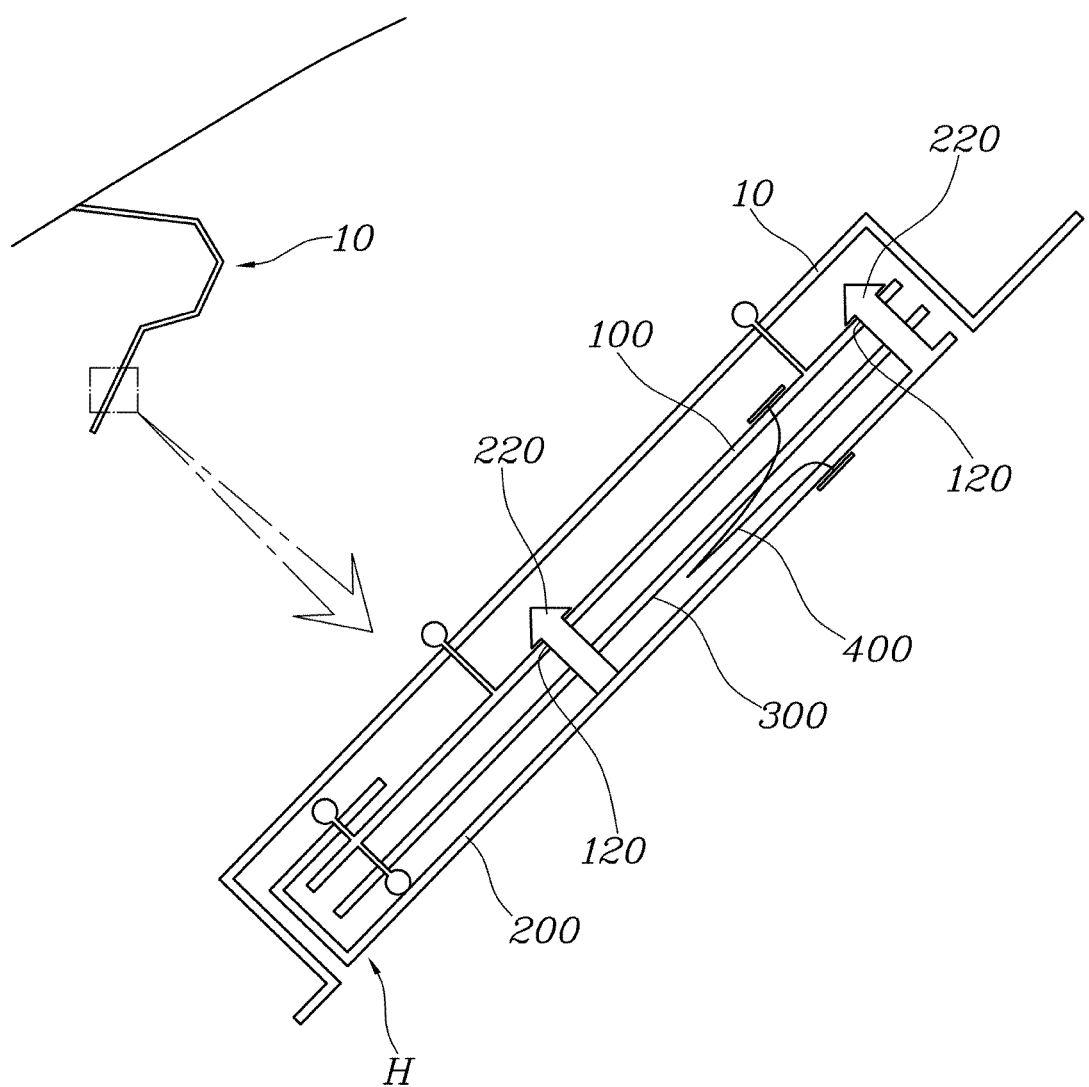
FIG. 1 is a view showing a structure in which a knee airbag according to the present invention is mounted to the instrument panel.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, a preferred embodiment of the present invention will be described in detail with reference to accompanying drawings.

FIG. 1 is a view showing a structure in which a knee airbag according to the present invention is mounted to the instrument panel, and the knee airbag may be applicable to a slim-type cockpit 10.

Referring to the drawing, the knee airbag of the present invention includes: an airbag housing 100 provided at a lower end of the cockpit 10, and including an airbag cushion 300 located toward an occupant; a cover 200 assembled or coupled to the airbag housing 100 in a shape of covering the airbag cushion 300, and wherein in deployment of the airbag cushion 300, a lower portion of the cover is fixed to the airbag housing 100 and an upper portion thereof is separated and opened from the airbag housing 100; and an opening limiting unit limiting an upper opening degree of the cover 200.

For example, a lower end of the instrument panel constituting the cockpit 10 is formed to be inclined and an embedding groove is formed in the inclined portion, and the airbag housing 100 is mounted into the embedding groove.

The airbag housing 100 may be coupled to the cockpit 10 by bolting.

Furthermore, the airbag cushion 300 is embedded between the airbag housing 100 and the cover 200, and the airbag cushion 300 is connected to an inflator (not shown), so that gas generated due to explosion of the inflator is supplied to the airbag cushion 300 in a collision accident.

Furthermore, a cover hook 220 is formed in the cover 200 toward the airbag housing 100, and a hooking hole 120 is formed in a portion of the airbag housing 100, the portion facing the cover hook 220, so that the cover hook 220 is assembled to the housing hooking hole 120.

The cover hook 220 and the housing hooking hole 120 are respectively provided at upper remaining areas except for lower fixed portions of the cover 200 and the airbag housing 100. Therefore, when the airbag is deployed, the upper portion of the cover 200 is opened while the cover hook 220 is separated from the housing hooking hole 120.

Specifically, the opening limiting unit is configured to connect the upper portion of the cover 200 to an upper portion of the airbag housing 100, and serves to limit the upper portion of the cover 200 to be opened by only a predetermined angle.

In other words, when the airbag cushion 300 inflates by the inflator gas, the upper portions of the cover 200 and the airbag housing 100 are separated from each other by a deployment force of the airbag cushion 300. However, the cover 200 and the lower end of the airbag housing 100 are fixed, and the cover 200 and the upper portion of the airbag housing 100 are opened while the opening degree is limited by the opening limiting unit.

Therefore, as the airbag cushion 300 is deployed toward the occupant while being guided by the cover 200, the airbag cushion 300 is prevented from sagging, and thus the airbag cushion quickly restrains the knees of the occupant without increasing a package of the airbag cushion 300, so that a risk of injury to the occupant is reduced.

Meanwhile, according to the present invention, the opening limiting unit is configured to limit the upper opening degree of the cover 200 by an elastically extended length of a connection part that is connected to both the airbag housing 100 and the cover 200 while being located therebetween to be extendable.

In other words, the connection part is elastically extendable in a process in which the upper portion of the cover 200 is opened on the lower end of the cover 200 as the center when the airbag is deployed, and the upper opening degree of the cover 200 is limited in response to the maximum extended length of connection part, thereby deploying the airbag cushion 300 while being prevented from sagging.

The above-described connection part may be embedded in various methods.

Figure 2:
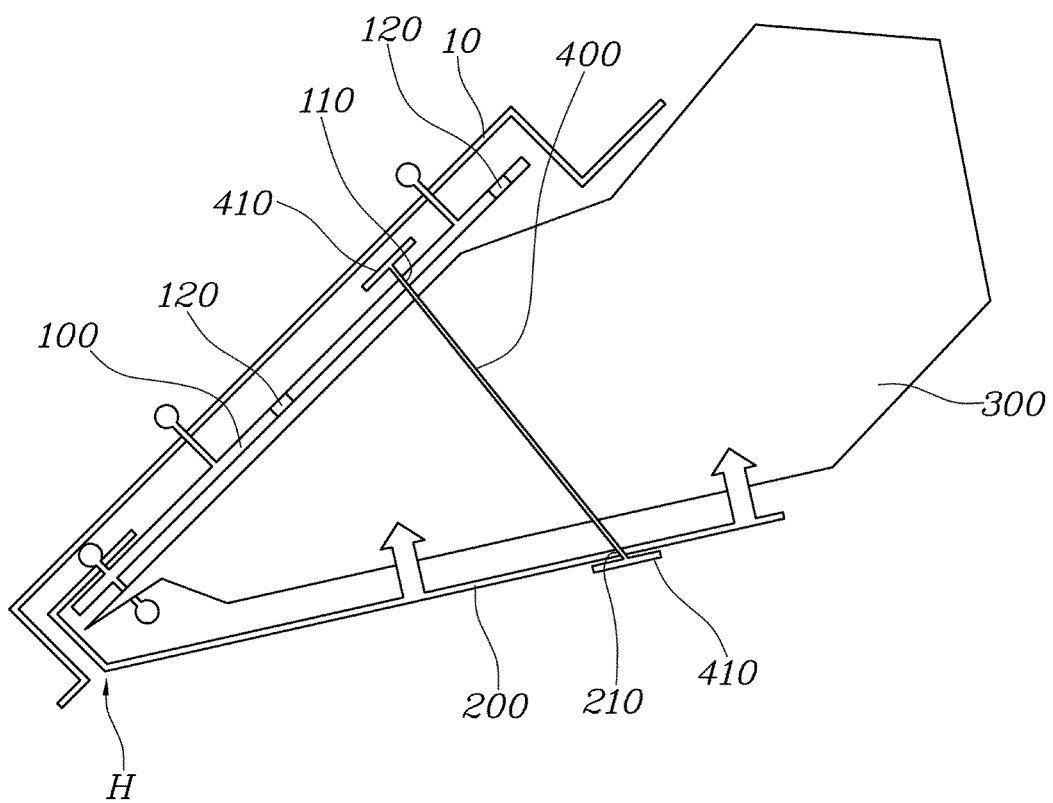
FIG. 2 is a view showing a structure of a connection part according to a first embodiment of the present invention.
Figure 3:
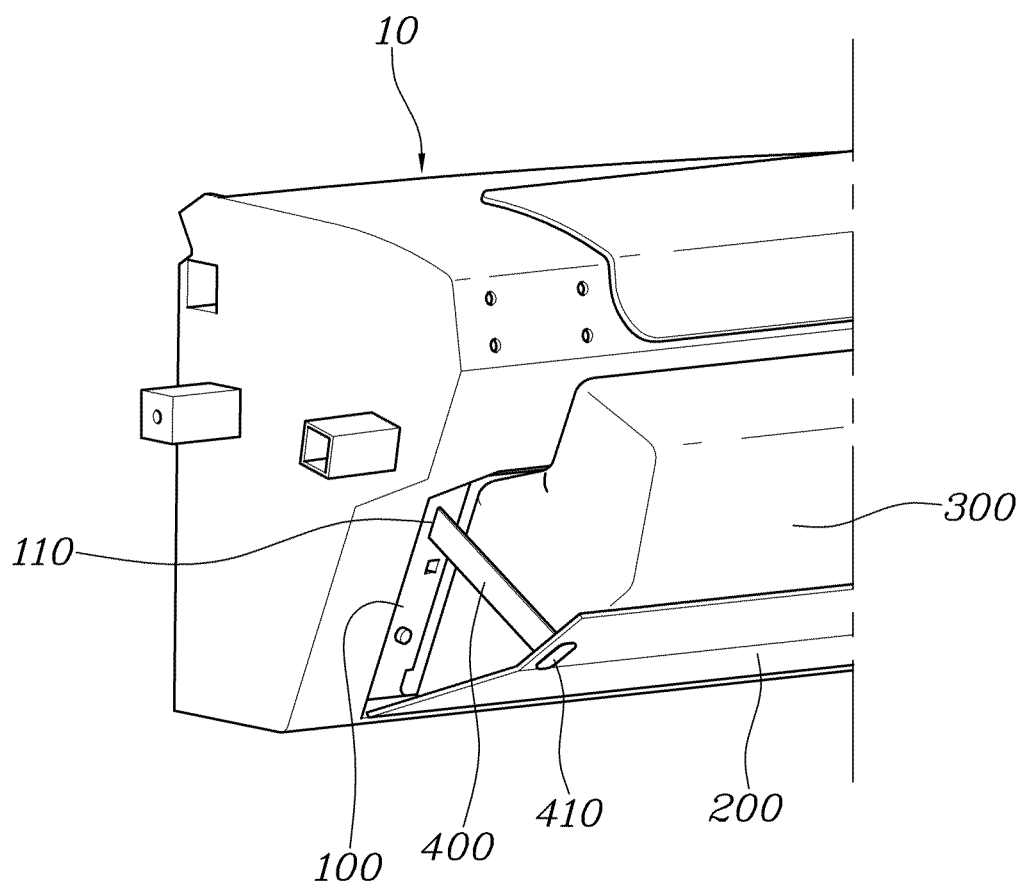
FIG. 3 is a view showing a shape of connection of the connection part with a tether in FIG. 2.

FIG. 2 is a view showing a structure of a connection part according to a first embodiment of the present invention. FIG. 3 is a view showing a shape of connection of the connection part with a tether 400 in FIG. 2.

Describing a structure of the connection part according to the first embodiment with reference to the drawings, the connection part is connected to the cover and the airbag housing with the tether 400.

Specifically, the tether 400 is formed in a band-shaped string, and a first end of the tether 400 is connected to the upper portion of the airbag housing 100, and a second end of the tether 400 is connected to the upper portion of the cover 200.

Therefore, when the upper portion of the cover 200 is opened, the tether 400 is unfolded and extended, and the tether 400 is extended to the maximum length to hold the cover 200 to prevent the cover 200 from rotating, so that the upper opening degree of the cover 200 may be limited.

Figure 4:
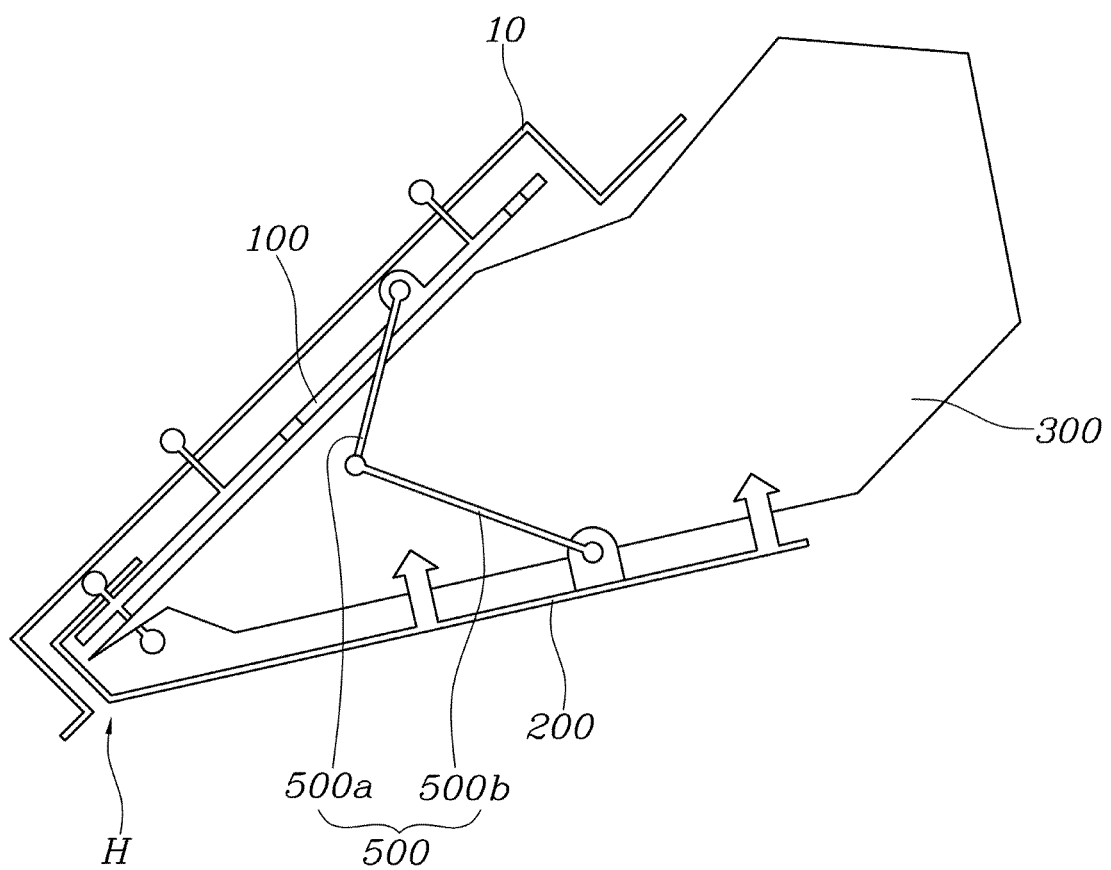
FIG. 4 is a view showing a structure of the connection part according to a second embodiment of the present invention.
Figure 5:
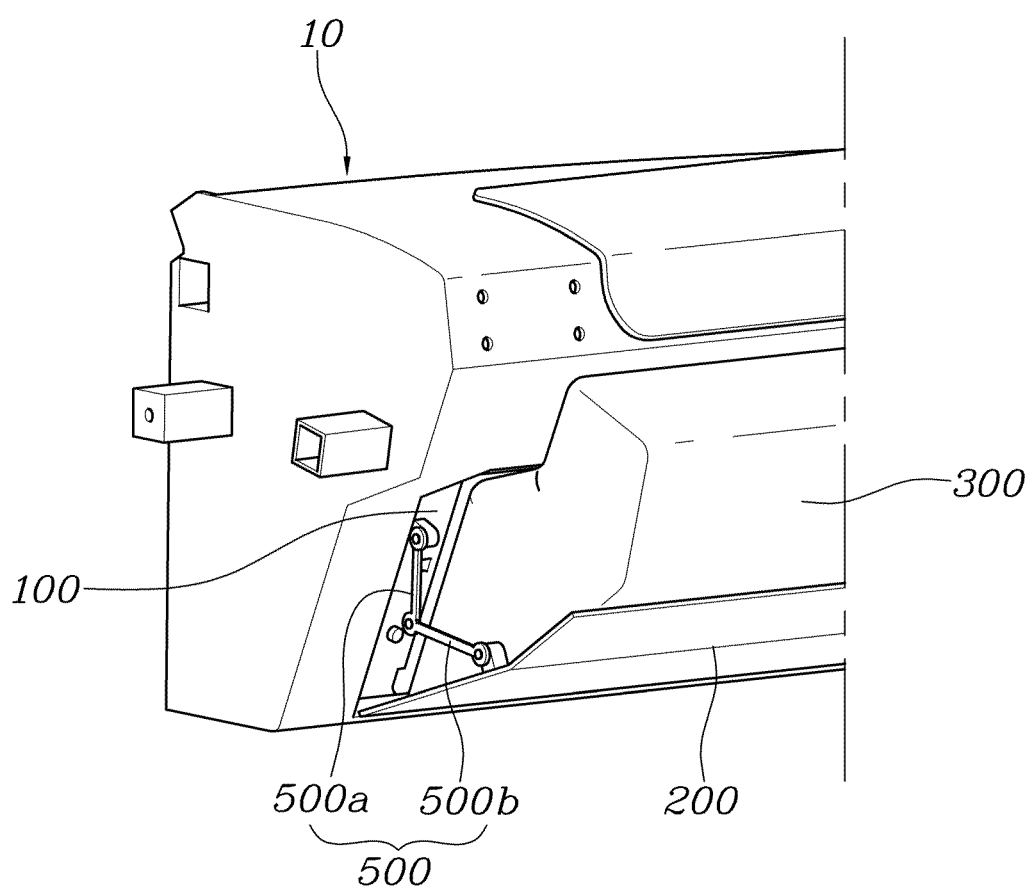
FIG. 5 is a view showing a shape of connection of the connection part with a link in FIG. 4.

FIG. 4 is a view showing a structure of the connection part according to a second embodiment of the present invention. FIG. 5 is a view showing a shape of connection of the connection part with a link 500 in FIG. 4.

Describing a structure of the connection part according to the second embodiment with reference to the drawings, the connection part is connected to the cover and the airbag housing with the link 500.

Specifically, the link 500 has a structure in which two links 500 are connected to each other, and a first end of a first link 500a is connected to the upper portion of the airbag housing 100, and a second end of the first link 500a is rotatably connected to a first end of a second link 500b.

A second end of the second link 500b is connected to the upper portion of the cover 200.

Therefore, when the upper portion of the cover 200 is opened, the first link 500a and the second link 500b are unfolded and the length of the link 500 is extended. The link 500 holds the cover 200 as the length thereof is extended to the maximum length to prevent the cover 200 from rotating, so that the upper portion of the cover 200 is limited in the opening degree.

Figure 6:
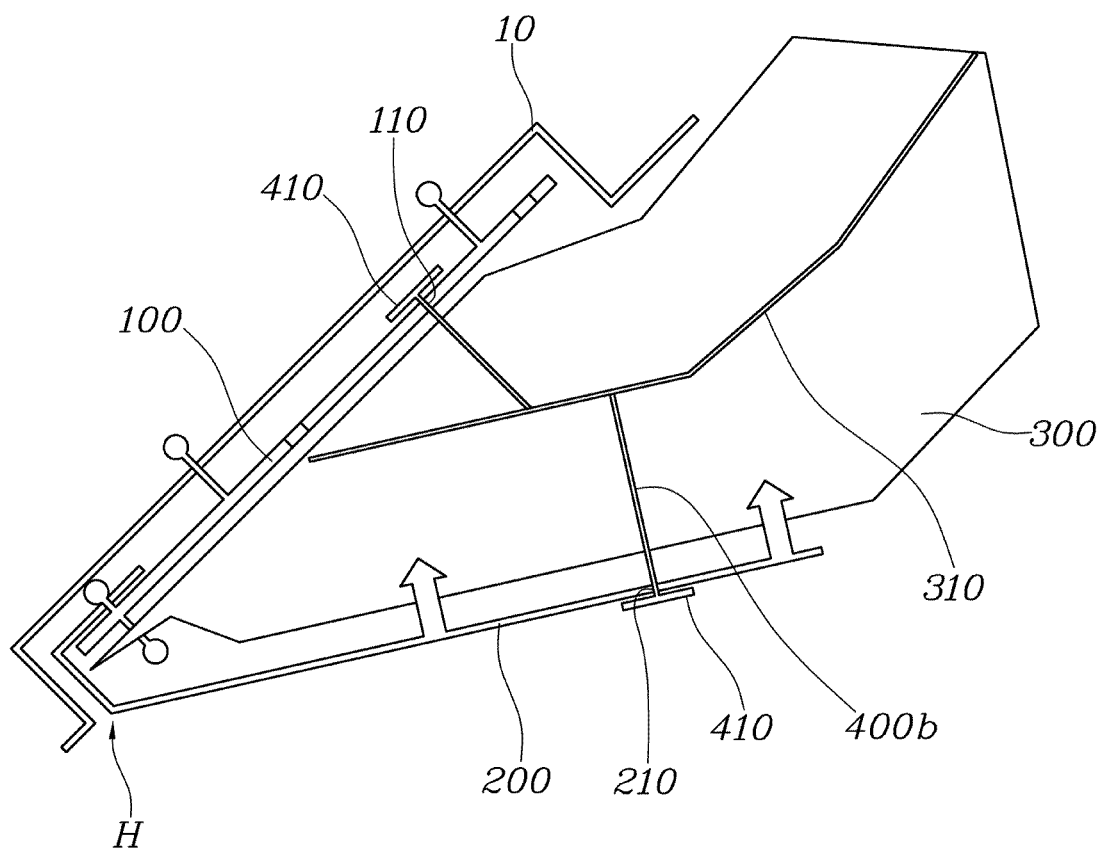
FIG. 6 is a view showing a structure of the connection part according to a third embodiment of the present invention.
Figure 7:
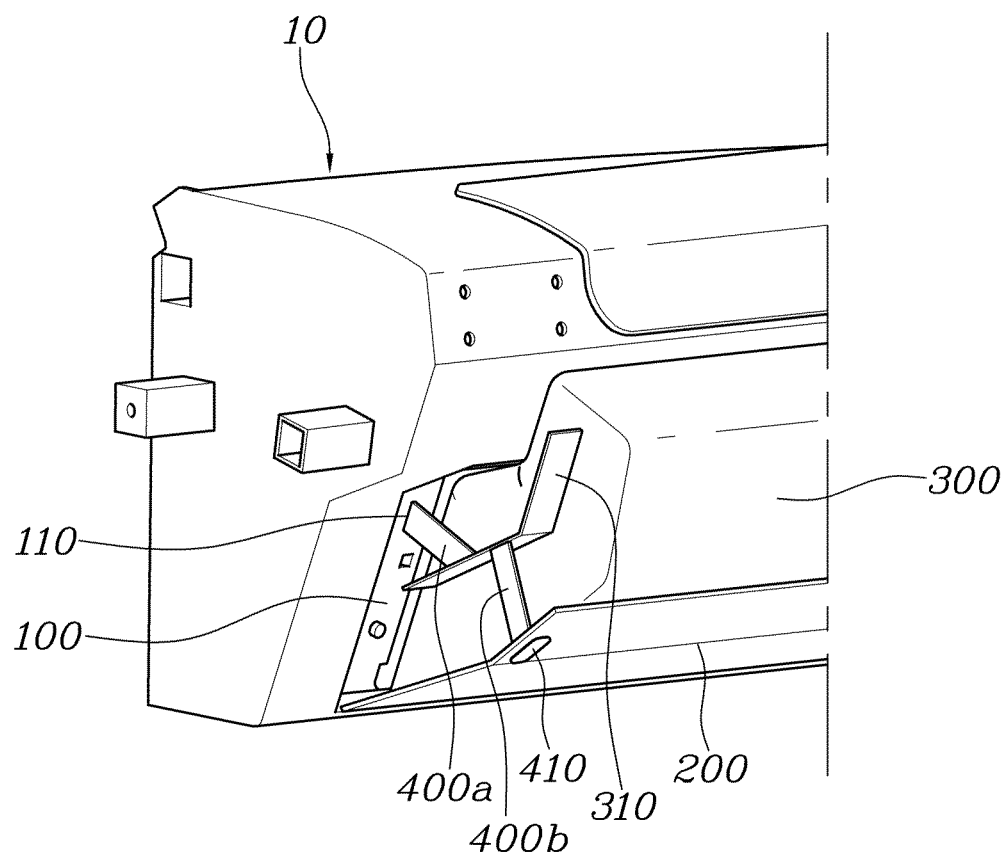
FIG. 7 is a view showing a shape of connection of the connection part with the tether and a selvage in FIG. 6.

FIG. 6 is a view showing a structure of the connection part according to a third embodiment of the present invention. FIG. 7 is a view showing a shape of connection of the connection part with the tether 400 and a selvage 310 in FIG. 6.

Describing a structure of the connection part according to the third embodiment with reference to the drawings, the connection part is configured to connect both the airbag housing 100 and the cover 200 to an outer surface of the airbag cushion 300, respectively.

Specifically, the upper portion of the airbag housing 100 and the airbag cushion 300 are connected to each other with a housing tether 400a, and the upper portion of the cover 200 and the airbag cushion 300 are connected to each other with a cover tether 400b.

Therefore, when the upper portion of the cover 200 is opened, the housing tether 400a and the cover tether 400b are unfolded and extended, and the cover 200 is held by the two tethers extended to the maximum length to prevent the cover 200 from rotating, so that the upper opening degree of the cover 200 may be limited.

In addition, the connection part may be connected to the selvage 310 formed at the outer surface of the airbag cushion 300.

For example, when the airbag cushion 300 is formed by sewing a front panel and a rear panel overlapped each other, the selvage 310 is formed by protruding along an edge of the airbag cushion 300 in which the front panel and the rear panel are connected to each other.

The housing tether 400a connected to the airbag housing 100 is connected to the selvage 310, and the cover tether 400b connected to the cover 200 is also connected to the selvage 310.

Meanwhile, as an example of the connection part connected to both the airbag housing 100 and the cover 200, an assembly of a hook 410 and a hooking hole 110, 210 may be applied.

Specifically, the hook 410 is formed in the connection part, and the hooking hole 110, 210 is formed in each of the airbag housing 100 and the cover 200, so that the hook 410 is assembled and connected to the hooking hole 110, 210.

For example, referring to FIG. 2, the hook 410 is formed in the first end of the tether 400, the hooking hole 110 is formed in the upper portion of the airbag housing 100. As the hook 410 is assembled to the hooking hole 110 of the airbag housing 100 in a fitting manner, the first end of the tether 400 is connected to the airbag housing 100.

In addition, the hook 410 is formed in the second end of the tether 400, and the hooking hole 210 is formed in the upper portion of the cover 200. As the hook 410 is assembled to the hooking hole 210 of the cover 200, the second end of the tether 400 is connected to the cover 200.

Referring to FIG. 6 as another example, the hook 410 is formed at an end of the housing tether 400a, and the hooking hole 110 is formed in the upper portion of the airbag housing 100. As the hook 410 is assembled to the hooking hole 110 of the airbag housing 100 in the fitting manner, the housing tether 400a is connected to the airbag housing 100.

In addition, the hook 410 is also formed at an end of the cover tether 400b, and the hooking hole 210 is also formed in the upper portion of the cover 200. As the hook 410 is assembled to the hooking hole 210 of the cover 200 in the fitting manner, the cover tether 400b is connected to the cover 200.

In addition, as another example in which the connection part is connected to both the airbag housing 100 and the cover 200, a riveting coupling structure may be applied.

Figure 8:
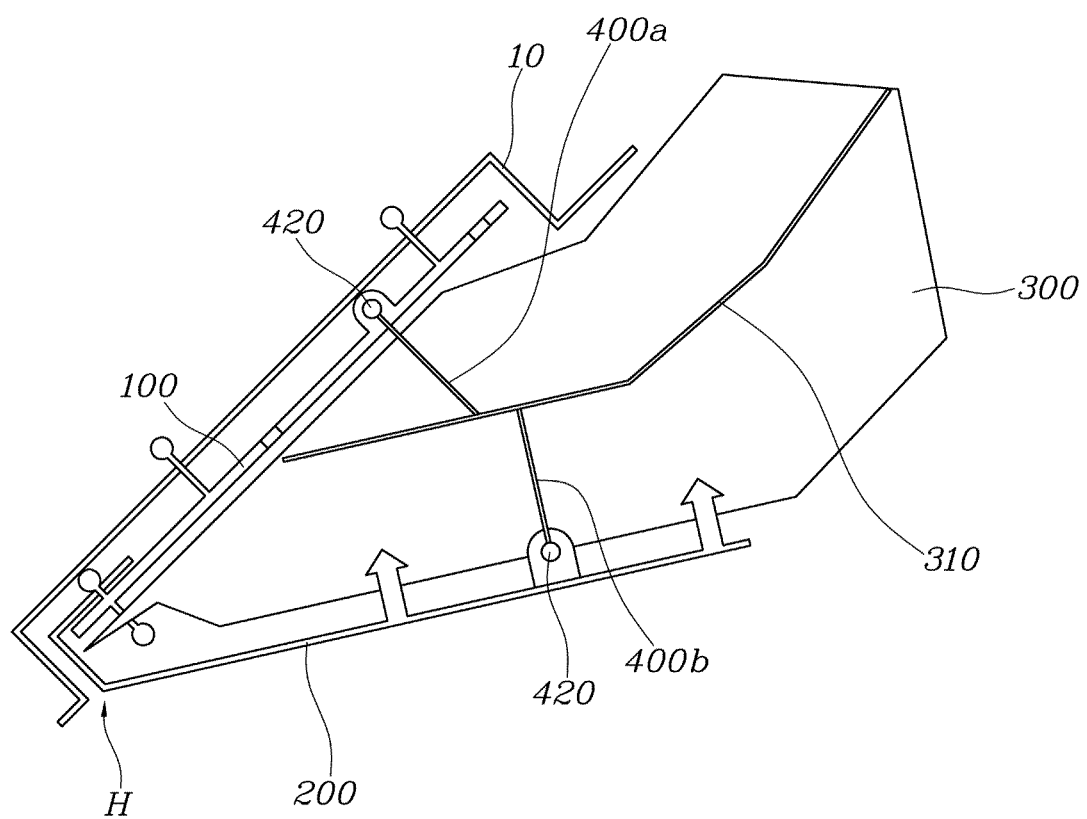
FIG. 8 is a view showing a structure in which coupling of the tether shown in FIG. 6 is achieved by riveting.
Figure 9:
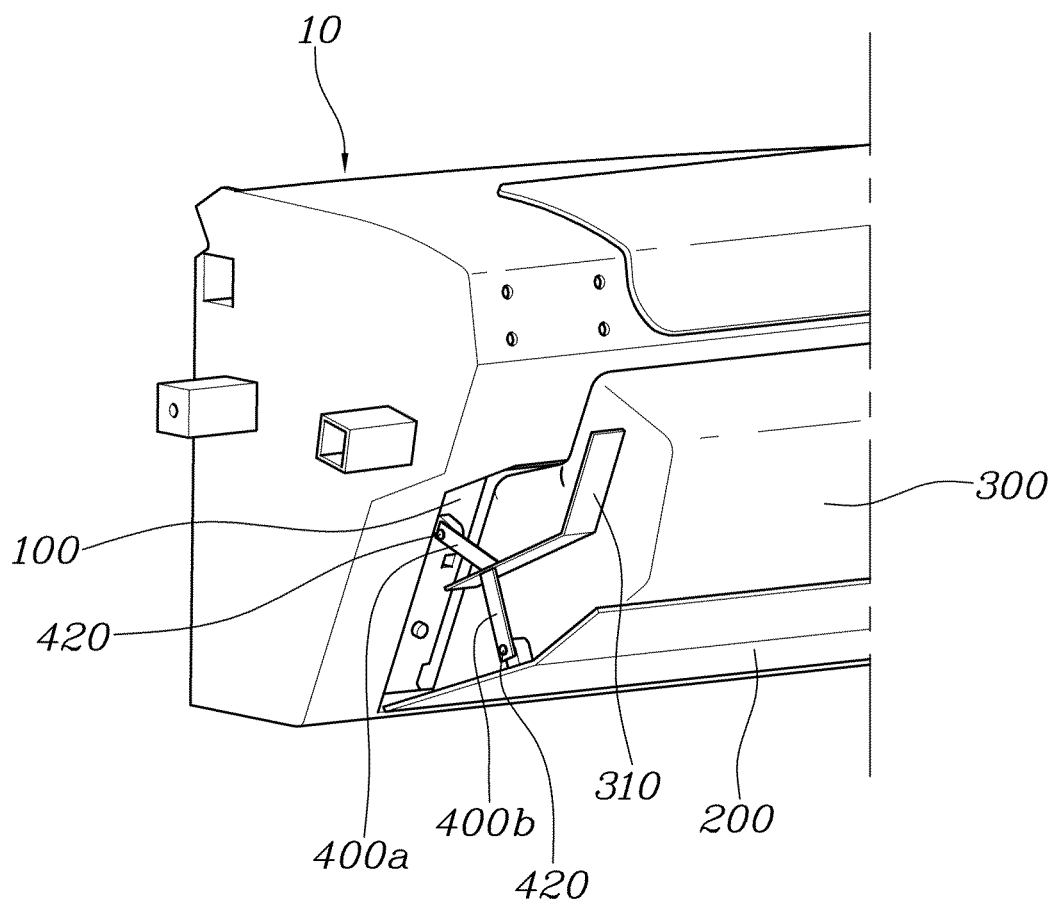
FIG. 9 is a view showing a shape of connection of the connection part with the tether and the selvage in FIG. 8.

FIG. 8 is a view showing a structure in which coupling of the tether 400 shown in FIG. 6 is achieved by riveting. FIG. 9 is a view showing a shape of connection of the connection part with the tether 400 and the selvage 310 shown in FIG. 8. The connection part may be connected to both the airbag housing 100 and the cover 200 by riveting.

Describing the connection part with reference to the drawings, a first end of the housing tether 400a connected to the airbag housing 100 is connected to the selvage 310, a second end of the housing tether 400a is riveted to the upper portion of the airbag housing 100 with a rivet 420.

Then, a first end of the cover tether 400b connected to the cover 200 is connected to the selvage 310, and a second end of the cover tether 400b is riveted to the upper portion of the cover 200 with a rivet 420.

Meanwhile, according to the present invention, the lower end of the cover 200 is coupled to the airbag housing 100 in a hinge structure H, so that the upper portion of the cover 200 is opened while rotating on the hinge structure H.

Referring to FIGS. 1 and 2, as the lower end of the cover 200 is assembled to the airbag housing 100 and the airbag cushion 300 by bolting, the hinge structure H is implemented at the lower end of the cover 200.

Therefore, the upper portion of the cover 200 may be opened on the hinge structure H.

Specifically, according to the present invention, the cover 200 is opened with the structure inclined upwardly toward the occupant.

In other words, in a state where the cover 200 and the lower end of the airbag housing 100 are fixed to each other, the upper portion of the cover 200 is separated from the airbag housing 100 and then is opened in the upwardly inclined shape toward the occupant.

Therefore, the airbag cushion 300 is upward deployed along an upward inclined surface of the cover 200, so that the airbag cushion 300 may be prevented from sagging and be quickly deployed.

Hereinbelow, a deployment action of the knee airbag according to the present invention will be described.

When the inflator of the knee airbag explodes due to a collision accident of a vehicle, the inflator gas is injected into the airbag cushion 300 so that the airbag cushion 300 inflates.

Herein, in a deployment process of the airbag cushion 300, the upper portion of the cover 200 is separated from the airbag housing 100 by a deployment force of the airbag cushion 300.

However, the lower end of the cover 200 is fixed to the lower end of the airbag housing 100 by the hinge structure H, so that the upper portion of the cover 200 is opened.

Specifically, in a process of opening the upper portion of the cover 200, the length of the connection part connecting the cover 200 to the airbag housing 100 is extended, and the opening degree of the upper portion of the cover 200 is limited in response to the maximum length of the extended connection part, so that the cover 200 is opened in the upward inclined direction.

Therefore, as the airbag cushion 300 is deployed upward along the cover 200 toward the occupant, the airbag cushion 300 is deployed while being prevented from sagging.

Specifically, the airbag cushion 300 is deployed higher than the end of the airbag housing 100 and the end of the cover 200, thereby safely protecting the knees of the occupant located at an upper end of the cockpit 10.

As described above, according to the present invention, the airbag cushion 300 is deployed toward the occupant while being guided by the cover 200 inclined upward, and thus the airbag cushion 300 is deployed while being prevented from sagging, and the airbag cushion quickly restrains the knees of the occupant without increasing a package of the airbag cushion 300 so that a risk of injury to the occupant is reduced.

Although the preferred embodiments of the present invention have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A knee airbag of a vehicle, comprising:
   an airbag housing disposed at a lower portion of a cockpit of the vehicle and containing an airbag cushion;
   a cover pivotally attached to the airbag housing and covering the airbag cushion, wherein the cover has a lower portion coupled to the airbag housing and an upper portion configured to be separated from the airbag housing to open the cover toward an occupant of the vehicle when the airbag cushion is deployed; and
   an opening limiting unit including a connection part configured to limit an opening degree of the cover when the airbag cushion is deployed;
   a selvage that protrudes laterally from a side surface of the airbag cushion; and
   wherein the connection part comprises a first tether and a second tether, the first tether connecting the airbag housing to a first side surface of the selvage and the second tether connecting the cover to a second side surface of the selvage.

2. The knee airbag of claim 1, wherein the connection part is configured to be elastically extended between the airbag housing and the cover and has an elastically extended length limiting the opening degree of the cover to a predetermined degree.

3. The knee airbag of claim 1, wherein:
   the cover extends by a length of the airbag housing from an upper portion of the airbag housing to a lower portion of the airbag housing, and
   the lower portion of the cover is pivotally coupled to the lower portion of the airbag housing.

4. The knee airbag of claim 1, wherein the cover is opened toward the occupant in an upwardly inclined direction toward the occupant.

5. The knee airbag of claim 1, wherein:
   the first tether includes a hook at an end portion thereof and the second tether includes a hook at an end portion thereof, and
   the airbag housing includes a hook hole in which the hook of the first tether is engaged and the cover includes a hook hole in which the hook of the second tether is engaged.

* * * * *